United States Patent [19]

Tanaka et al.

[11] 4,105,335

[45] Aug. 8, 1978

[54] INTERFEROMETRIC OPTICAL PHASE DISCRIMINATION APPARATUS

[75] Inventors: Nobuyoshi Tanaka; Naoki Ayata, both of Yokohama; Mitsuo Takeda; Susumu Matsumura, both of Kawasaki; Kazuya Matsumoto, Yokohama, all of Japan

[73] Assignee: Canon Kabushiki Kaisha, Tokyo, Japan

[21] Appl. No.: 813,298

[22] Filed: Jul. 6, 1977

Related U.S. Application Data

[63] Continuation of Ser. No. 698,681, Jun. 22, 1976, abandoned.

[30] Foreign Application Priority Data

Jun. 28, 1975 [JP] Japan ................................. 50/80635

[51] Int. Cl.$^2$ ........................ G01B 9/02; G02B 21/06
[52] U.S. Cl. .................................. 356/108; 356/110; 356/113; 350/14
[58] Field of Search .......................... 356/106–113; 350/14

[56] References Cited

U.S. PATENT DOCUMENTS

| | | | |
|---|---|---|---|
| 2,518,647 | 8/1950 | Teeple et al. | 356/108 |
| 2,578,859 | 12/1951 | Teeple et al. | 356/108 |
| 2,655,073 | 10/1953 | Strickler et al. | 356/108 |
| 3,319,515 | 5/1967 | Flournoy | 356/108 |

*Primary Examiner*—Conrad J. Clark
*Attorney, Agent, or Firm*—Fitzpatrick, Cella, Harper & Scinto

[57] ABSTRACT

Film of a known refractive index whose thickness is to be measured is illuminated by a white light beam. Two wave fronts from both sides of the film are directed to an interferometer. The wave fronts are out of phase in accordance with the thickness of the film. The two wave fronts are amplitude-split, respectively, by the beam splitter of the interferometer. Two of the split wave fronts are tilted by tilting means in the interferometer. The other two split wave fronts, as well as the two tilted wave fronts, are directed to an interference surface. Thus, there is formed a white interference pattern on the interference surface. The white interference pattern has a middle peak and two side peaks. The space interval between these peaks is measured by a scanner. By knowing the peak-to-peak interval, it is possible to discriminate the space interval between both sides of the film.

11 Claims, 11 Drawing Figures

$x=-nd\cos\phi/\tan\theta \quad x=0 \quad x=nd\cos\phi/\tan\theta$ $x=-nd\cos\phi/\tan\theta \quad x=0 \quad x=nd\cos\phi/\tan\theta$

FIG. 7
FIG. 9
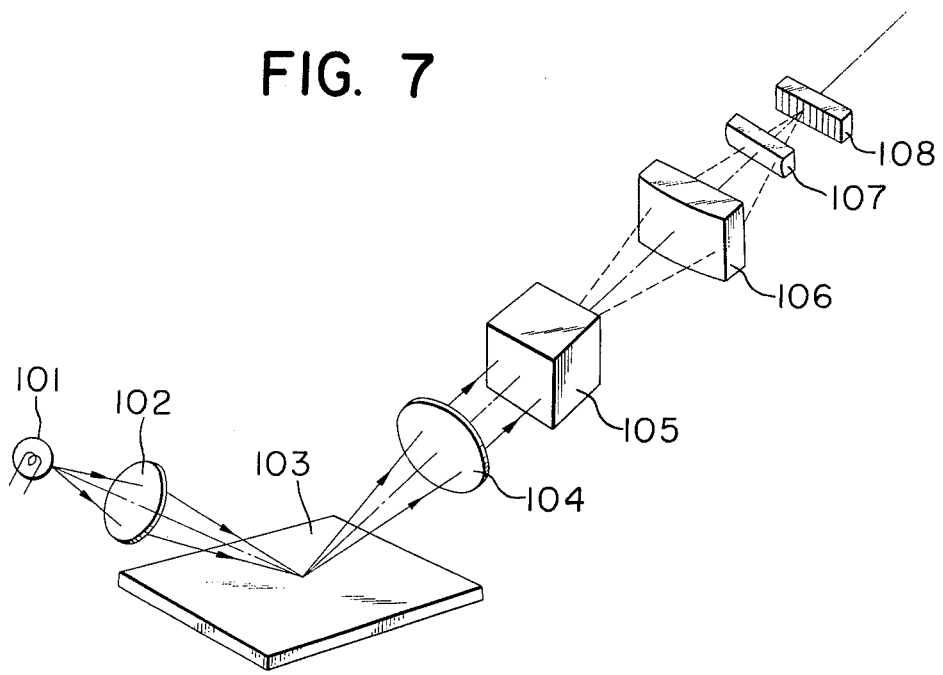
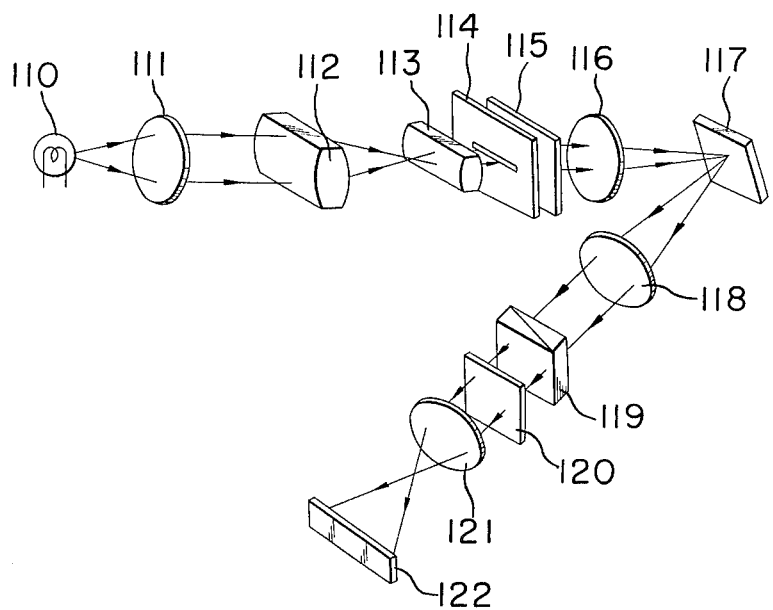

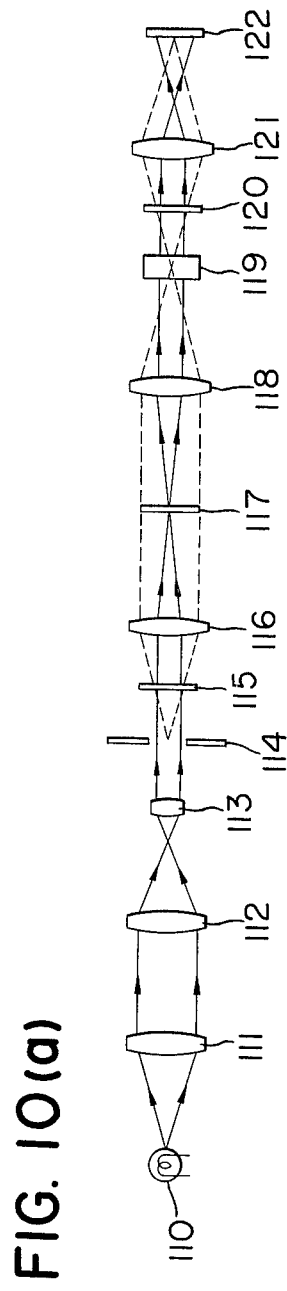
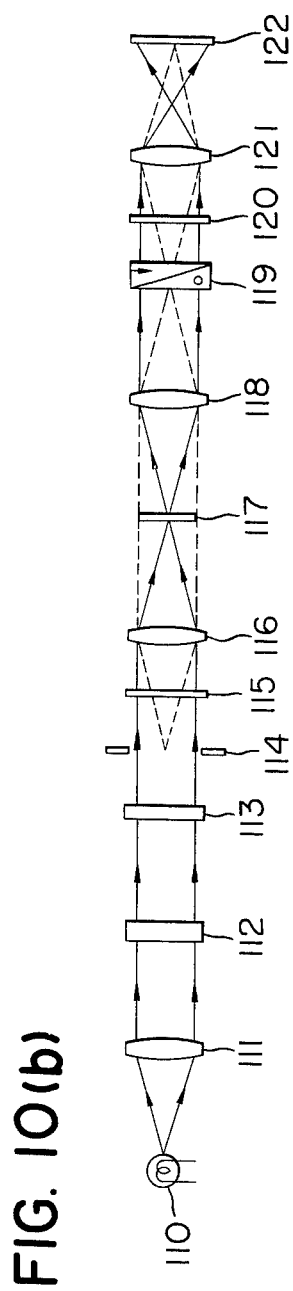
FIG. 10(a)
FIG. 10(b)

INTERFEROMETRIC OPTICAL PHASE DISCRIMINATION APPARATUS

This is a continuation of application Ser. No. 698,681, filed June 22, 1976, now abandoned.

BACKGROUND OF THE INVENTION

1. Field of the Invention

This invention relates to an apparatus for interferometrically measuring the thickness of film or evaporated film or the glass-to-glass interval and generally, optical phase such as thickness or refractive index of optically transparent substance film.

2. Description of the Prior Art

An apparatus for interferometrically measuring optical phase is disclosed in U.S. Pat. No. 2,518,647 issued on Aug. 15, 1950. This U.S. Patent shows a technique wherein the wave fronts coming from both sides of a film illuminated by a source of white light are respectively directed to an interferometer comprising a tilted translucent surface and an untilted reflecting surface, so that each of the two wave fronts from the film is amplitude-split by the tilted translucent surface and the other two wave fronts split by the reflection are tilted and directed to an interference surface, while the two wave fronts split by the transmission are reflected by the untilted reflecting surface and directed to the interference surface, whereby white interference patterns are formed on the interference surface. Then the film thickness is measured from the difference in length of optical path between the positions whereat the mutually intensifying interference patterns are formed. Similar methods of measurement are known from U.S. Pat. Nos. 2,578,859 and 2,655,073. However, all these are of the type in which the measurement of film thickness is effected from the difference in length of optical path between the positions whereat the mutually intensifying interference patterns are formed, and this is inconvenient to the automatization of the measurement. An apparatus which has overcome such inconvenience is disclosed in U.S. Pat. No. 3,319,515 (corresponding German Pat. No. 1,447,253).

According to this apparatus, the light beams from a first and a second surface of a specimen illuminated by a source of broadband light are directed to an interferometer such as Michelson's interferometer or the like and one of two split optical paths of the interferometer is vibrated over a certain span, namely, one of two mirrors to which the two wave fronts split by the beam splitter of the Michelson's interferometer are respectively directed is vibrated over a certain span so as to produce an optical path difference with respect to the other mirror; the amount of displacement during such vibration is represented by time axis, and the lapse of time between a time point whereat the interference peak resulting from the vibration appears and a time point in said span which corresponds to the position whereat the vibrating mirror lies is measured and the optical phase is measured with the measured lapse of time as the function. A feature of this apparatus is that it measures the lapse of time and therefore, the vibrating mirror must be linear with respect to time. Such a mirror which vibrates linearly with respect to time is extremely difficult to obtain. This is apparent from the fact that the inventor of such method shows in his patent specification the method of measuring the pulse number corresponding to the amount of displacement of the vibrating mirror, instead of measuring the lapse of time.

SUMMARY OF THE INVENTION

It is a primary object of the present invention to provide a method of measurement which does not use such a vibrating mirror but produces an optical path difference.

Such an object of the present invention may be achieved by amplitude-splitting two wave fronts from both sides of a film specimen by the use of a beam splitter in an interferometer, tilting two of the split wave fronts with respect to the other two wave fronts and superposing them upon each other, and measuring the space interval between peaks of a white interference pattern resulting from said superposition, by the use of a scanner.

The invention will become more fully apparent from the following detailed description thereof taken in conjunction with the accompanying drawings.

BRIEF DESCRIPTION OF THE DRAWINGS

FIG. 7 is a schematic illustration of a third embodiment of the present invention.

FIGS. 9, 10(a) and 10(b) schematically illustrate a fifth embodiment of the present invention.

DESCRIPTION OF THE PREFERRED EMBODIMENTS

Figure 1:
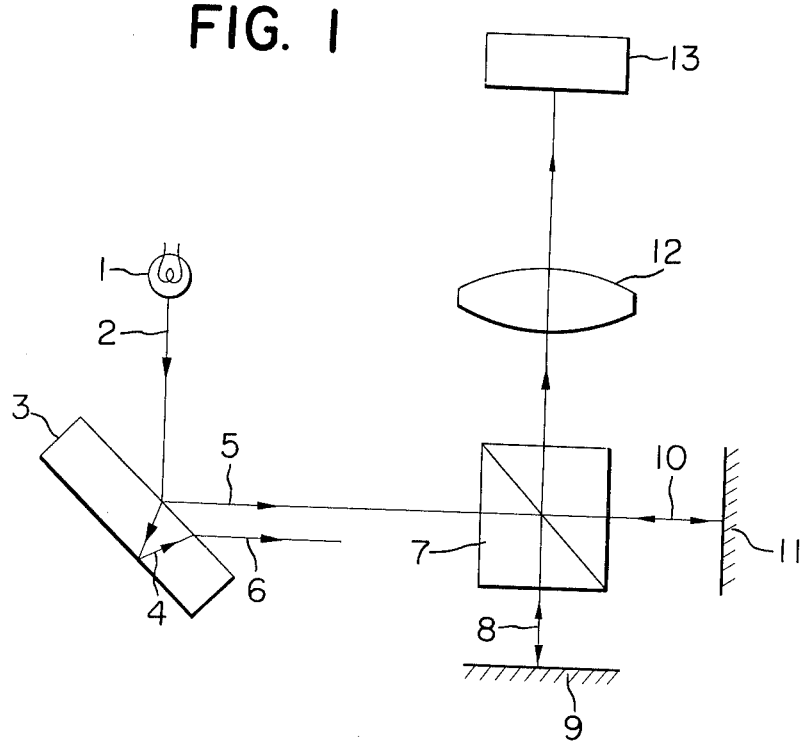
FIGS. 1 and 2 schematically illustrate the principle of the present invention.
Figure 2:
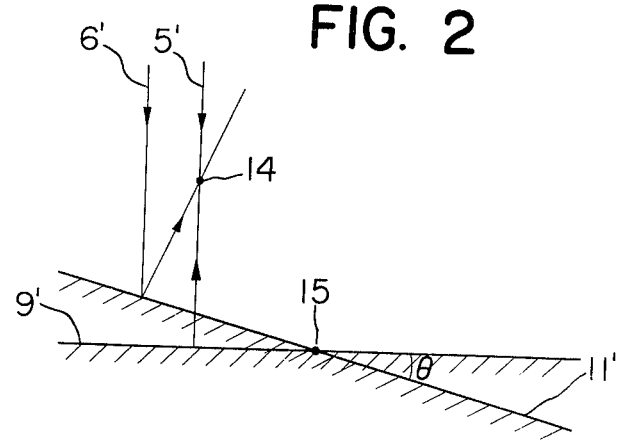
Figure 3:
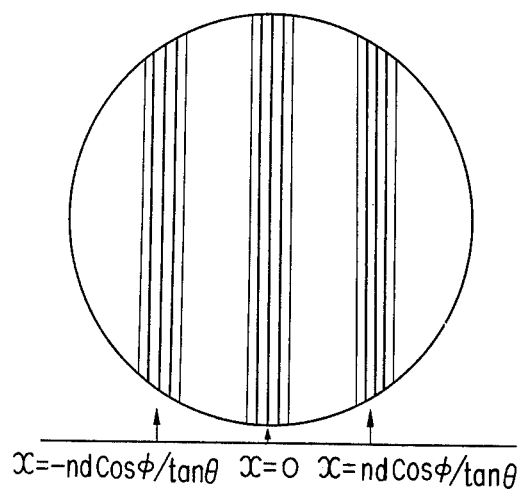
FIGS. 3 and 4 illustrate a white interference pattern and its waveform, respectively.
Figure 4:
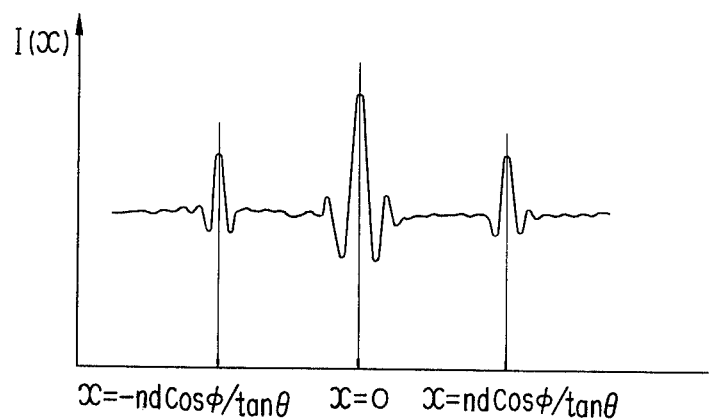

Referring to FIGS. 1, 2 and 3, these illustrate the principle of the present invention. In FIG. 1, the light beam 2 from a source of broadband white light 1 illuminates a specimen 3. The light beam 2 provides a light beam 5 reflected by a first reflecting surface of the specimen 3 and a light beam 4 refractively entering the specimen and reflected by a second reflecting surface of the specimen. The latter beam 4 refractively emerges from the specimen to provide a light beam 6 parallel to the reflected light beam 5. Let the thickness of the specimen be $d$, the refractive index thereof be $n$ and the angle of incidence of the light beam upon the second reflecting surface be $\phi$. Then there is a spacing of 2nd cos $\phi$ created between the light beams 5 and 6. These two beams enter a so-called Michelson's interferometer comprising a beam splitter 7, mirrors 9, 11 and a lens 12, in which interferometer the beams are amplitude-split by the beam splitter 7 to provide light beams 8 and 10, respectively. The light beam 8 is reflected by the mirror 9 to pass back through the beam splitter 7 and further through the lens 12 to a screen 13. The other light beam 10 is reflected by the mirror 11 and again reflected by the beam splitter 7 to pass through the lens 12 to the screen 13. Assume that the mirror 11 is tilted relative to the mirror 9. FIG. 2 depicts a virtual image 11' of the mirror 11 with respect to the beam splitter and the mirror 9' which is the mirror 9 itself. In this figure, the two mirrors are also tilted relative to each other. The light beam 5' is perpendicularly incident on the mirror 9'. Assuming that two light beams 5' and 6' out of phase with each other enter such mirror system, the components contributing to the interference will be the reflection of the light beam 6' from the mirror 11' and the reflection of the light beam 5' from the mirror 9', and the white interference pattern is localized at the intersection 14 between the two reflections. With the x-axis disposed parallel to the mirror 9', the position whereat the white interference pattern is localized lies at a point spaced apart by approximately $nd \cos \phi / \tan \theta$ from the intersection 15 between the mirrors 9' and 11', namely, a point represented by $x = nd \cos \phi / \tan \theta$. In addition to this white interference pattern, a white interference pattern resulting from the light beams 5' and 6' themselves is created in the neighborhood of the intersection 15 and thus, a white interference pattern from these beams 5' and 6' is also produced at a point $x = nd \cos \phi / \tan \theta$ which is opposite in direction with respect to the intersection 15. Thus, the lens 12 shown in FIG. 1 focuses these localized white interference patterns upon the screen 13. If the magnification of the lens 12 is $Ix$, the interference patterns projected upon the screen 13 will be observed as shown in FIG. 3. The distribution of intensity of light in the direction of the x-axis in such case may be given as $I(x) = \int i(k) \cos^2(knd \cos\phi) \cos^2(kx \tan \theta) \, dk$, where $i(k)$ may be given by multiplication of the spectral distribution of the light source, the spectral sensitivity of the observation system and the spectral transmittivity of the optical system, and $k$ is the number of waves. A typical form of such distribution of intensity of light is depicted in FIG. 4. Let the white interference peak created at $x = 0$ be defined as the middle peak, the white interference peak created at $x = nd \cos \phi / \tan \theta$ as a first side peak, and the white interference peak created at $x = -nd \cos \phi / \tan \theta$ as a second side peak. Then, $nd \cos \phi / \tan \theta$ may be obtained by detecting the spacing from the point whereat the middle peak is created to the point whereat the first or the second side peak is created, or the spacing from the point whereat the first peak is created to the point whereat the second peak is created, or the spacing from a reference point on the predetermined x-axis to the point whereat the first or the second side peak is created. Thus, by substituting the refractive index $n$ of the specimen in $nd \cos \phi / \tan \theta$, the thickness $d$ of the specimen can be measured.

Should the refractive index $n$ of the specimen be also unknown, it will be possible to obtain the refractive index $n$ and the thickness $d$ of the specimen individually by measuring the angle of projection $\phi$ upon the specimen twice, for example, as $\phi = 0°$ and $\phi = 45°$. In FIG. 1, the specimen to be measured has been described to have two reflecting surfaces, but in the case of a specimen having more than two reflecting surfaces, namely, a specimen comprising a plurality of layers, if there is sufficient light beam reflected from each of the reflecting surfaces, a white interference pattern will be provided at a point corresponding to the thickness of each layer, thereby enabling the thickness of each layer to be measured.

Also, for a double refractive substance, the retardation created between the beam of P-polarized light and the beam of S-polarized light passing through such substance may be measured in the same manner as described above.

Figure 5:
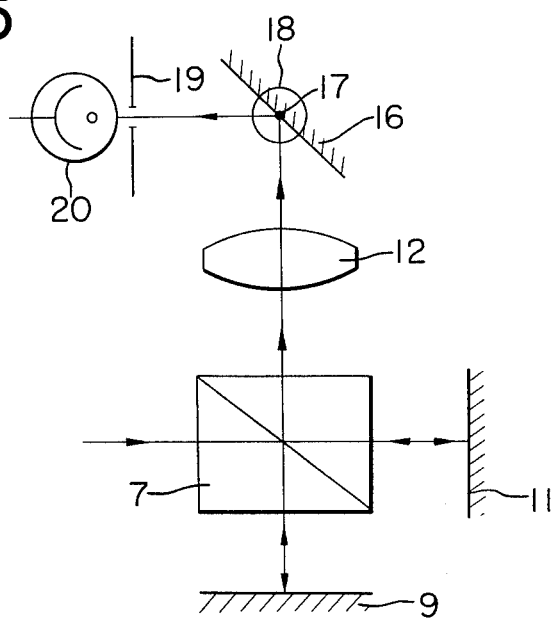
FIGS. 5 and 6 schematically illustrate a first and a second embodiment of the present invention.

The method according to the present invention is very advantageous in that the mirrors of the interferometer may be secured in somewhat tilted position relative to each other and there is no such movable position as the mirrors of the interferometer used in the method of the aforementioned U.S. Pat. No. 3,319,515 (German Pat. No. 1,447,253) which require very sophisticated adjustment. Another advantage of the present invention will become apparent in connection with the method of detecting a spatially formed white interference pattern which will hereinafter be described. A method of detecting a white interference pattern is to place a unidimensional photodiode array in the screen position of FIG. 3 in parallelism to the x-axis. Thus, when the photodiode array is scanned in succession, there is provided a white interference pattern converted into the time axis to thereby enable the thickness of the specimen to be obtained from the time interval at which interference peaks are created. The use of such a photodiode array is advantageous in that the photodiode array is much better in linearity as compared with the method of U.S. Pat. No. 3,319,515 (German Pat. No. 1,447,253) wherein it is very difficult to obtain movable mirrors of good linearity and good momentum which vary either of the split light paths of the interferometer. In fact, elements each having a great number of (several hundred to two thousand) unidimensionally arrayed photodiodes are commercially available from Reticon, Co., Inc. of the United States and other companies, and may readily be utilized to carry out the present invention. The detection of the white interference pattern may also be accomplished by the use of ITV which has the same function as the photodiode array. As an alternative embodiment, the white interference pattern may be detected by rotation or vibrating a rotatable mirror 16 about a pivot 17 as indicated by 18 in FIG. 5 and with the aid of a pin-hole 19 and a photodetector 20. In this case, a greater quantity of light may be provided if a slit is used as the pin-hole 19 with the fact taken into account that the pin-hole is formed unidimensionally as shown in FIG. 3.

Figure 6:
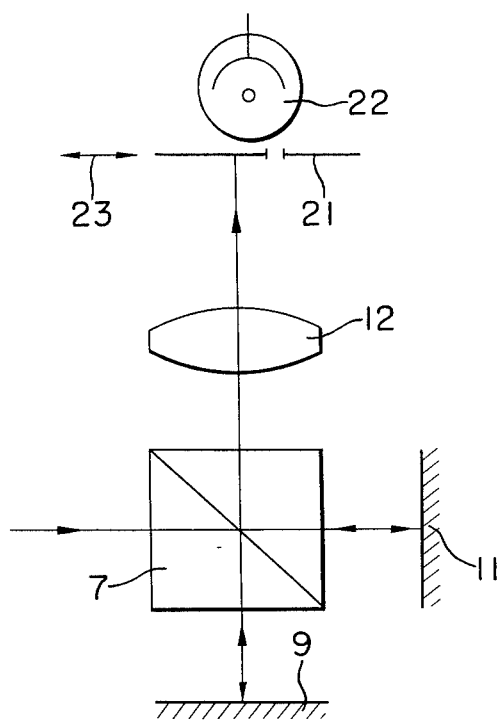

Further, alternatively, as shown in FIG. 6, a pin-hole or slit 21 may be moved in the directions of double-headed arrow 23 and the distribution of the white interfere pattern may be detected by a photodetector 22.

In any of the above-described methods of detecting the white interference pattern, the white interference pattern is formed unidimensionally and in view of this, a cylindrical lens may be combined with the lens 12 to provide a further greater quantity of light. An optical system using such a cylindrical lens is shown in FIG. 7. The light beam emitted from a light source 101 is condensed on a specimen through an image-forming lens 102 and the reflected light beam from the specimen is substantially collimated by a lens 104 and directed to a tilt type interferometer 105. The white interferometer pattern localized in the neighborhood of the tilted mirror of the interferometer are imaged on unidimensional photodiodes by an anamorphic optical system 106, 107. In that case, by making the focal length of the cylindrical lens 107 having the imaging function in a perpendicular direction to the direction of array of the diodes shorter than the focal length of the cylindrical lens 106 having the imaging function in the direction of array of the diodes, the longitudinal magnification of the white interference pattern shown in FIG. 3 may be reduced relative to the lateral magnification thereof to thereby enable the quantity of light of the white interference pattern to be effectively directed to the surface of the unidimensional photodiodes.

Figure 8:
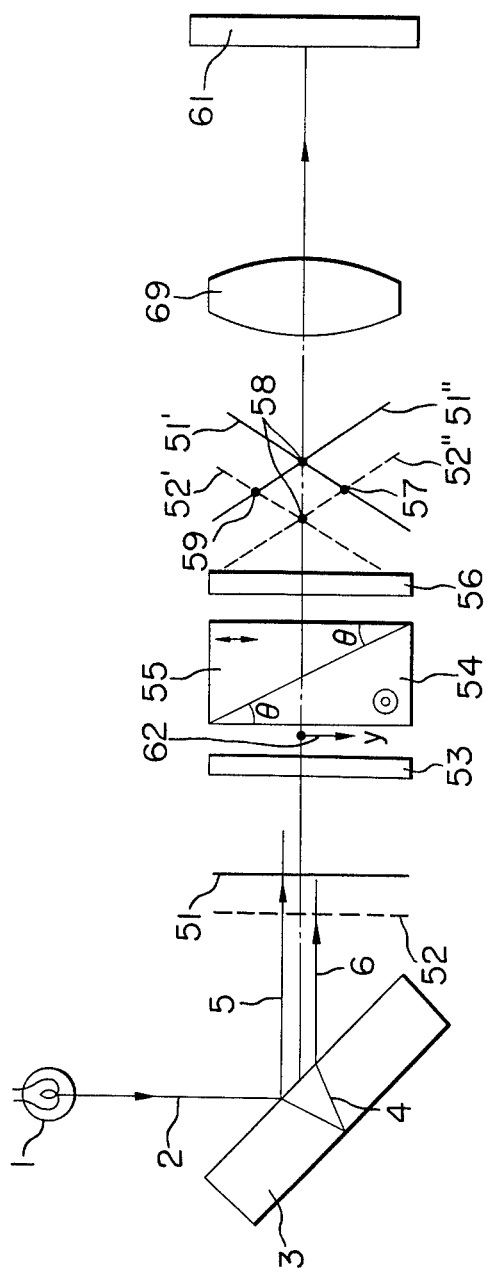
FIG. 8 is a schematic illustration of a fourth embodiment of the present invention.

The interferometer has been described as being a Michelson's interferometer but in practice, a Mach-Zehnder or other interferometer may also be used. As an analogue to these interferometers, use may be made of an optical system using a Wollaston prism, a Rochon prism or a Senarmont prism. FIG. 8 shows an embodiment which employs a Wollaston prism. The Wollaston prism may be provided by cutting a double-refractive substance such as crystal into a piece having an optical axis oriented as indicated by 54 and a piece having an optical axis oriented as indicated by 55, and joining these two pieces together. Designated by 53 is a polarizer whose direction of polarization is adjusted to form an angle of 45° with the optical axes of the crystals 54 and 55. An analyser 56 is disposed so as to form a parallel- or crossed-Nicol with the polarizer. When the wave front 51 of the light beam 5 reflected by the surface of the specimen 3 and the wave front 52 of the light beam reflected by the back side of the specimen and delayed in light path by 2nd cos $\phi$ fall on such a system, the wave fronts 51 and 52 are each split into two by the Wollaston prism while, at the same time, the wave fronts become tilted, thus providing wave fronts 51', 52' and 51'', 52''. Suppose y-axis as indicated by 62 which has its origin located on a plane where the thicknesses of the prisms 54 and 55 are equal. The optical path difference created between the wave fronts 51' and 51'' will be given as $2(ne-no)y \tan\theta$, where $no$ is the refractive index of the double-refractive substance for normal rays and $ne$ is the refractive index of such substance for abnormal rays. The wave fronts 51' and 51'' and the wave fronts 52' and 52'' mutually interfere in the neighborhood of point 58 or $y=0$, thus providing the middle peak. The wave fronts 51' and 52'' mutually interfere in the neighborhood of point 57, and the wave fronts 52' and 51'' mutually interfere in the neighborhood of point 59. These interferences provide side peaks, respectively. These take place at a location whereat $2nd \cos\phi$ approximately equals $2(ne-no)y \tan\theta$, namely, in the neighborhood of $y=nd \cos\phi/(ne-no) \tan\theta$. These white interference patterns are localized in the neighborhood of the Wollaston prism and thus, the lens 60 focuses these white interference patterns upon a photodetector 61 such as a photodiode array. Such use of a Wollaston prism may also enable the thickness and refractive index of the specimen to be measured, as is the case with the use of a Michelson's interferometer. If the thickness of the specimen is several tens of μm at best, the inclinations of the wave fronts may be several minutes of angle.

If the Wollaston prism is to be formed of crystal, the thickness of the prism may be of the order of 2 mm in order to provide such a degree of inclination for the wave fronts and this leads to a very compact construction of the interferometer. Thus, the interferometer using a Wollaston prism has various advantages over the Michelson's interferometer: the inclinations of the wave fronts can be determined during the manufacture of the prism, thus eliminating the necessity of adjusting the inclination of the mirrors during the assembly as in the case of Michelson's interferometer; no variation with time occurs; and the construction is extremely compact.

In the previous embodiment of FIG. 7 which employs a unidimensional photodiode array, description has been made of the optical system for reducing the white interference pattern in a perpendicular direction to the direction of array of diodes to use the quantity of light effectively, but the anamorphic optical system employed as such optical system is usually disadvantageous in that it suffers from a great amount of aberration.

FIGS. 9, 10(a) and (b) illustrate another embodiment of the optical system for effectively directing the quantity of interference pattern light to the unidimensional photodiode array. FIG. 10(a) is a developed cross-sectional view of the optical system, and FIG. 10(b) is a developed top plan view thereof. The light beam from a source of white light 110 is substantially collimated by a lens 111 and the beam diameter is vertically compressed by an afocal cylindrical lens system 112, 113 to illuminate a slit opening 114. The parallel light beam passed through the slit opening 114 is passed through a polarizing plate 115 and condensed upon the specimen surface 117 by a lens 116.

In the present invention, the light need not always be condensed upon the specimen surface but if the surface configuration of the specimen is unfavorable, the condensation of the light will be preferred because it will reduce the influence of the specimen surface configuration and improve the S/N ratio of the output signal from the diode array.

The reflected light beam from the specimen 117 is directed through a lens 118 to a tilt type interferometer 119. In this embodiment, the interferometer is shown to be a Wollaston prism. The neighborhood of the center of the Wollaston prism and the slit opening 114 are in conjugate relationship so that the image of the slit opening is formed near the center of the Wollaston prism. Since a white interference pattern is formed in the light beam of the slit opening image near the center of the Wollaston prism, such interference pattern is projected through a polarizing plate 120 onto a unidimensional photodiode array 122 by an image-forming lens 121. Since the image of the slit opening 114 is also formed on the photodiode array 122, the quantity of light of the white interference pattern can be directed onto the photodiode array, without being lost, by making the size of the slit opening image smaller than the size of the light-receiving surface of the photodiode array 122. In the present embodiment wherein the white interference pattern is directed onto the photodiode array 122 by the conventional image-forming lens system 121, the influence of the distortion or like aberration of the lens may be smaller than in the previous embodiment which employs the anamorphic lens system.

The direction of deflection of the polarizing plate in the present embodiment forms an angle of 45° with the optical axis of the Wollaston prism, as in the previous embodiment.

In any of the embodiments of the present invention, the light source has been shown as a source of white light, but a source of visible or invisible light is likewise available if it is of broadband.

Thus, the present invention is advantageous over the conventional method of thickness measurement in that the thickness and refractive index of a specimen can be measured in a nondestruction and non-contact fashion, that the measuring takes only a very short time and that the apparatus can be constructed without any movable portion and can thus be designed as a compact apparatus.

What is claimed is:

1. An interferometric optical phase discrimination apparatus comprising:
   a source of broadband radiation emitted within a predetermined spectrum for illuminating a specimen having first and second surfaces;

an interferometer to which two wave fronts coming from said first and second surfaces are directed, said interferometer having beam splitter means, tilting means and beam direction means so that said two wave fronts are each split by said beam splitter means, whereafter two of the wave fronts split by said beam splitter means are tilted by said tilting means with respect to the other two wave fronts split by said beam splitter means and all of said four split wave fronts are directed to an interference surface by said beam direction means, whereby an interference pattern appears on said interference surface; and scanning means for scanning said interference pattern and for determining the distance between a predetermined point on the interference pattern and one of peaks of the interference so that the optical phase may be discriminated from said distance.

2. An apparatus according to claim 1, wherein said interferometer is a Michelson's interferometer.

3. An optical phase discrimination apparatus comprising:

a source of broadband radiation emitted within a predetermined spectrum for illuminating a specimen having first and second surfaces;

beam splitting and tilting means for obtaining a first wave front coming from said first surface, a second wave front coming from said first surface and being tilted with respect to said first wave front, a third wave front coming from said second surface and a fourth wave front coming from said second surface and being tilted with respect to said third wave front;

an interference surface to which said first, second, third and fourth wave fronts are directed so as to form an interference pattern of said four wave fronts; and scanning means for scanning said interference pattern and for determining a distance between a predetermined point on the interference pattern and one of peaks of the interference so that the optical phase may be discriminated from said distance.

4. An apparatus according to claim 3, wherein said beam splitting and tilting means includes a Wollaston prism.

5. An apparatus according to claim 3, wherein said beam splitting and tilting means includes a Rochon prism.

6. An apparatus according to claim 3, wherein said beam splitting and tilting means includes a Senarmont prism.

7. An apparatus according to claim 4 wherein said beam splitting and tilting means further includes polarizer and analyser.

8. An optical phase discrimination apparatus comprising:

a source of broadband radiation emitted within a predetermined spectrum for illuminating a specimen having first and second surfaces;

angular shear type birefringence prism means for obtaining a first wave front coming from said first surface, a second wave front coming from said first surface and being tilted with respect to said first wave front, a third wave front coming from said second surface and a fourth wave front coming from said second surface and being tilted with respect to said third wave front;

an interference surface to which said first, second, third and fourth wave fronts are directed so as to form an interference pattern of said four wave fronts whereby the optical phase may be discriminated by determining the distance between a predetermined point on the interference pattern and one of peaks of the interference.

9. An apparatus according to claim 8, further comprising:

optical imaging means for imaging the interference pattern on an imaging plane and an array of directional photosensitive elements positioned at the imaging plane.

10. An apparatus according to claim 9, wherein said optical imaging means includes a cylindrical element.

11. An optical phase discrimination apparatus comprising:

an illuminating optical system for illuminating a specimen having a source of broadband radiation emitted within a predetermined spectrum and a converging optical means for converging light beam coming from said source on the specimen;

beam splitting and tilting means for obtaining a first wave front coming from said first surface, a second wave front coming from said first surface and being tilted with respect to said first wave front, a third wave front coming from said second surface and fourth wave front coming from said second surface and being tilted with respect to said third wave front;

an interference surface to which said first, second, third and fourth wave fronts are directed so as to form an interference pattern of said four wave fronts whereby the optical phase may be discriminated by determining the distance between a predetermined point on the interference pattern and one of peaks of the interference so that the optical phase may be discriminated from said distance.

* * * * *

UNITED STATES PATENT AND TRADEMARK OFFICE
CERTIFICATE OF CORRECTION

PATENT NO. : 4,105,335
DATED : August 8, 1978
INVENTOR(S) : NOBUYOSHI TANAKA, ET AL It is certified that error appears in the above—identified patent and that said Letters Patent are hereby corrected as shown below:

Column 3, line 15, delete "x=nd" to --x=-nd--.

Signed and Sealed this

Tenth Day of July 1979

[SEAL]

Attest:

Attesting Officer

LUTRELLE F. PARKER
Acting Commissioner of Patents and Trademarks